METHOD OF COATING A SUBSTRATE WITH CAPSULES

Filed May 5, 1969

INVENTORS
JOHN G. WHITAKER &
VICTOR A. CRAINICH

United States Patent Office 3,578,482

Patented May 11, 1971

3,578,482
METHOD OF COATING A SUBSTRATE WITH CAPSULES

John G. Whitaker, Englewood, and Victor A. Crainich, Jr., Dayton, Ohio, assignors to The National Cash Register Company, Dayton, Ohio Filed May 5, 1969, Ser. No. 821,737
Int. Cl. B05c *1/16;* B44d *1/14*
U.S. Cl. 117—38 14 Claims

ABSTRACT OF THE DISCLOSURE

A process in which a dispersion containing an inert liquid vehicle, for example, water, a binder such as polyvinyl alcohol and a profusion of capsules having elastic, readily distored walls containing liquid internal core material such as an odoriferous substance are coated through a screen onto a substrate by the application of pressure to the capsular dispersion. The capsule walls are subsequently hardened. The walls may then be ruptured by the application of pressure to the capsules to release the internal core material.

BACKGROUND OF THE INVENTION

This invention relates generally to a method of coating liquid-containing capsules, en masse, onto a substrate. More particularly, it relates to the screen coating of a profusion of pressure-rupturable capsules whose walls are elastic and readily distorted during their coating through a screen onto a substrate, but which are subsequently hardened while on the substrate itself.

The general process of screen printing of a variety of inks and other materials is well-known. Generally, in this type of printing process the image carrier is a screen, often called a stencil, attached to the bottom of a frame. The screen can be made of, among others, silk, synthetic fibers such as nylon and Dacron, and thin wires of metal such as stainless steel. Although a substrate may be coated using the entire screen, usually the image of the configuration desired to be printed onto the substrate is formed by blocking all the pores of the screen other than those coinciding with the image through which the printing material will flow. Sometimes the art has described the use of a partially-blocked screen which lays down an image on a substrate as screen printing and at times it refers to the use of the entire screen without any blocked pores as coating. It is to be clearly understood that for purposes of this improved process, the word coating includes both the use of the entire screen or the partially-blocked screen. The coating of the image takes place by applying pressure to be viscous liquid material which forces it through the open pores of the screen into contact with a substrate positioned underneath. The pressure is usually applied by a hard rubber or plastic squeegee or other equivalent device. Normally, the viscous fluid is a pigmented "ink" dispersion containing a liquid vehicle, a pigment and a resinous base which includes one or more resins, at least one of which is a binder to adhere the pigment particles to the surface of the substrate to be coated.

The prior art discloses capsules coated on substrates by conventional processes. For example, U.S. Pat. No. 3,031,344 discloses the coating of solid particles covered by a noble metal onto a base by means of a conventional silk screen. U.S. Pat. No. 3,063,864 discloses a number of conventional coating processes used to lay down on a base sheet a dispersion of either solid or liquid droplets. This patent further discloses an encapsulating medium which encloses each droplet of the dispersion in a shell. Rupture of the shell will release the liquid.

The application of pressure required in a screen coating technique by means of a device forcing a dispersion of particles through the screen generally presents no particular problems because the particles usually are either solid with or without a coating or merely dispersed liquid droplets which can flow through the screen with their liquid vehicle. However, in the case of dispersed capsules having hard shell-like walls containing liquid internal cores, the aforementioned application of pressure to force the capsular dispersion through the screen presents a distinct problem. The applied pressure, particularly the kind of sliding, shearing pressure often termed "strain" experienced in the screen coating process, ruptures a great number of the hard-shelled capsules, thus materially reducing the amount of capsules transferred in the coating of the substrate. This results in a wholly unsatisfactory coated product since a large percentage of the liquid internal core material is lost during the coating procedure.

Accordingly, it is the object of this invention to provide an improved process of coating liquid-containing capsules onto a substrate.

A further object is to provide an improved process of screen coating liquid-containing capsules having elastic, readily distorted walls onto a substrate and then hardening the walls to render them more easily pressure-rupturable.

With these and other objects in view, this invention includes novel features, the essential elements of which are described in the following summary and description of the drawings and preferred embodiments.

SUMMARY OF THE INVENTION

The above mentioned problems and disadvantages are overcome by applicants' invention which provides a coating process comprising, first, encapsulating liquid internal core material in capsules walls which are elastic and readily distorted. These capsules are then dispersed in a liquid vehicle, or preferably the dispersion may be formed using the same vehicle in which the capsules were manufactured. In the latter case, the capsules are already dispersed in their own liquid manufacturing vehicle. To the liquid vehicle is also added a binder material for adhering the capsules onto a substrate. The dispersion is then introduced onto a screen having an open portion defining an image which it is desired to coat on a substrate. While the capsule walls are still elastic and readily distorted, pressure is applied to the dispersion to force it through the open portion of the screen into contact with the substrate placed underneath. The capsule walls are subsequently treated, which treatment may include only drying, to harden them. The drying operation also leaves the hard capsules firmly bound to the substrate by the binder material which was present in the vehicle.

Applicants' aforedescribed process essentially obviates the problem of capsule rupture during the step of forcing the dispersion of capsules through the screen. The elastic and readily distorted walls change dimensional shape or give sufficiently in response to the sliding and shearing pressure applied to the dispersion such that they do not rupture but merely remain distorted until the pressure is removed, at which time they have been forced through the screen and are located in the coating on the substrate. The transfer to the susbtrate of essentially all the capsules in the area of the open portion of the screen produces a final improved coating on the substrate which includes substantially all the liquid internal core material which was contained in the coated dispersion and which is now available in the coating for its intended use. These coated substrates find utility in the display field. For example, the capsules may contain liquid crystal materials such as cholesteryl chloride and cholesteryl pelargonate, which change color in response to thermal changes in proximity to the capsules. The liquid crystal containing capsules may be coated onto a substrate in any desired configuration or over the entire surface of the substrate. The coated substrate may then be employed as a display which changes color when an object having the appropriate temperature is brought into thermal contact with it.

An additional advantage of applicants' process is obtained when it is desired to rupture the capsules which are coated on a substrate and then hardened. The amount of the liquid internal core of the capsule which is transferred to the substrate is extremely important and the rupture of a large number of capsules during the coating process results in a completely unsatisfactory product. Applicants' process provides a means for obtaining on a substrate a coating of capsules which can be ruptured by applying pressures thereto which applied pressures amount to the same or less than those pressures employed during the actual step of coating the capsules on the substrate. Generally, such pressures are a combination of compressive and shear forces and accordingly, the word pressure should be considered to include these two forces for purposes of this process. This surprising result is obtained by providing the capsules with elastic, readily distorted walls during the coating step. Subsequently, the capsule walls are hardened while on the substrate which renders them more easily ruptured. Easy access to the liquid material within the capsule walls is provided by merely drawing a hard object across the coating. For example, elastic, readily distorted capsules containing a liquid fragrance may be screen coated on a paper sheet which is employed in advertising the fragrance material, the capsules hardened and the fragrance easily released by rupturing the capsules. Other rupturable capsules which can be coated on a substrate by this improved method contain liquid such as adhesives, insect repellents, pharmaceuticals, cleaning agents, and others, as the internal core material.

It should be understood that the amount of elasticity and distortion of the walls of the capsules, even within the same dispersion, can vary somewhat, but the greater this elasticity and distortion, the greater the pressure which may be applied during the coating process without rupturing the walls. Even though the elasticity and distortion may not be great, small increments of these characteristics allow some additional pressure to be applied which could not be applied to capsules having hardened walls and thus contribute to an improved process and product.

DESCRIPTION OF THE DRAWING

FIG. 3*b* has interposed between the capsules and the substrate a barrier layer.

DESCRIPTION OF THE INVENTION

Figure 1:
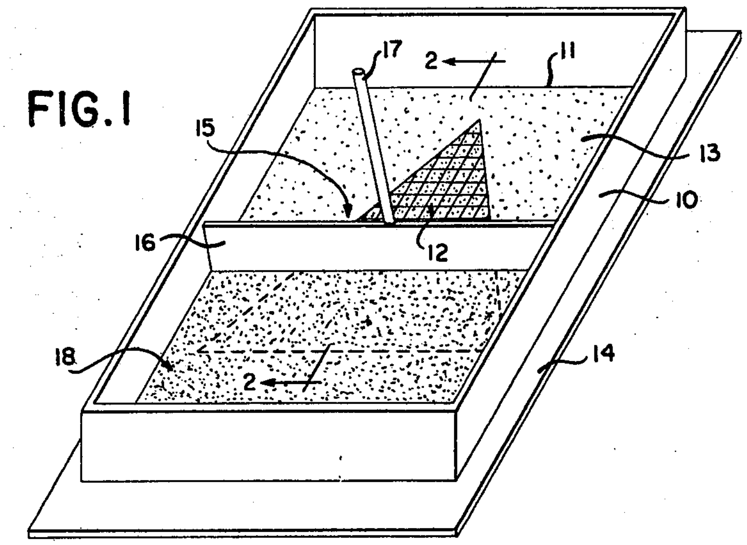
FIG. 1 is a perspective view of a typical squeegee, frame and screen which are employed in this invention.

Referring now to FIG. 1 of the drawing, typical apparatus employed in this improved process is illustrated. As shown, the apparatus comprises a frame 10 to which has been fastened a screen 11 having a central triangular section 12 and a peripheral section 13. The pores of the central section 12 are open to permit the flow of a capsule-containing dispersion therethrough. The peripheral section 13 has its pores blocked with some inert substance, for example, shellac, lacquers, nitrocellulose, cellulose acetate and the like, to provide a configuration corresponding to the image which it is desired to coat on the substrate 14 located underneath the screen and frame.

The operation of the apparatus of FIG. 1 in the improved process of this invention comprises introducing onto the screen a dispersion 18 containing capsules having elastic, readily distorted walls, a resinous binder, a liquid vehicle and other optional materials such as viscosity controlling agents, pigments, dyes and the like. This dispersion, which cannot flow through the open portion 12 of the screen because of its high viscosity, is spread lightly and substantially uniformly over the entire screen. The squeegee 15, having a blade 16 and a handle 17, is then placed in a position within the frame 10 uppermost in FIG. 1 and pulled in a direction toward the bottom of FIG. 1. At the same time pressure exerted on the squeegee in a downward direction results in the blade 16 forcing the dispersion 18 through the open section 12 of screen 11 into contact with substrate 14 where it remains in an image conforming to the open section 12.

Figures 2A, 2B, 2C:
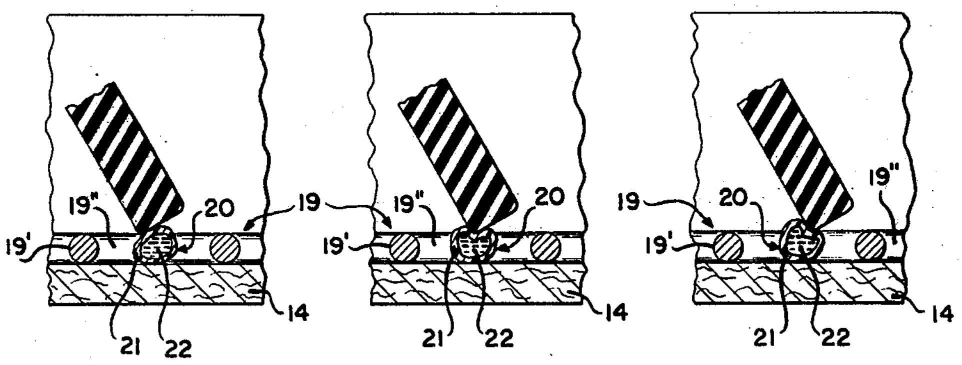
FIGS. 2*a*, 2*b* and 2*c* are a series of greatly enlarged, diagrammatic, cross-sectional views taken on line 2—2 of FIG. 1 showing sequentially, from right to left, the action of the squeegee on an individual capsule during the coating operation.

Because of the nature of the movement of squeegee 15, blade 16 exerts both a downward pressure and a sliding, shearing pressure on the elastic, readily distorted capsule walls. The action of the squeegee blade on a single capsule is illustrated diagrammatically in FIGS. 2*a*, 2*b* and 2*c*, from right to left, in which there is shown the substrate 14, the blade 16 of a squeegee, wires 19 which appear both in cross-sections 19' and longitudinal portions 19'', and a capsule 20 having an elastic, readily distorted wall 21 and a liquid internal core 22. Although only a single capsule is shown for purposes of clearly indicating the action of the sqeegee thereon, it is readily apparent that this same type of distortion, to a greater or lesser extent, depending on the thickness of the dispersion coated on the substrate, the pressure exerted by the operator on the squeegee, the number of layers of capsules contained in the thickness of the dispersion, and the state of the capsule walls themselves, is experienced by each and every capsule in the dispersion.

Figure 3A:
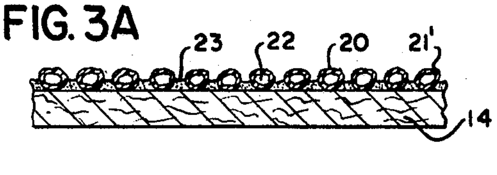
FIGS. 3*a* and 3*b* are greatly enlarged, schematic representations of hard liquid-containing capsules adhered to a substrate.
Figure 3B:
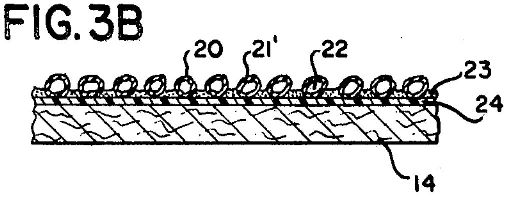

The final coated product illustrated diagrammatically in FIGS. 3*a* and 3*b* comprises a substrate 14 on which has been coated a large number of capsules 20 having hardened walls 21' and liquid internal cores 22. The capsules are held in place by a resinous binder 23. FIG. 3*b* additionally shows a barrier layer 24 interposed between the capsules 20 and the substrate 14. The barrier layer provides protection for the substrate in cases where the capsular dispersion 18 contains one or more ingredients which will deleteriously affect the substrate. For example, if the substrate is paper which contains water-soluble or swellable components and the capsular dispersion is aqueous, then a barrier layer 24 of pigmented or clear moisture resistant film forming polymer such as ethyl cellulose, cellulose acetate, nitrocellulose, oleo resin, lacquer, polyethylene and the like, is coated onto the substrate prior to and at least coextensive with the coating of the capsules.

Turning now to a detailed description of the steps of the preferred embodiments of the improved process of this invention and the materials employed therein, generally each step will be discussed in the order in which it is carried out unless otherwise indicated in the description.

In the process of this invention, there is first established a substantially homogeneous dispersion comprising an inert liquid vehicle, capsules having elastic, readily distorted walls and a liquid internal core material, and a resinous binder, either dissolved or dispersed in the liquid vehicle, for adhering the capsules to the substrate on which they will be coated. This dispersion can be established by introducing the capsules and the resinous binder into the liquid vehicle in any order. For example, the binder is dissolved in a portion of the liquid vehicle and the capsules, whose walls comprise a natural or synthetic organic polymer plasticized with any well-known plasticizer therefor to render it elastic and readily distorted, are mixed with a second portion of the liquid vehicle. The two portions of the liquid vehicle, each with its inclusions, are then agitated together to form a substantially homogeneous dispersion.

Preferably, the vehicle in which the capsules are manufactured is employed as the inert liquid vehicle. Exemplary of the formation of a substantially homogeneous dispersion employing such a vehicle are various well-known liquid-liquid phase separation processes in which the intended liquid internal core material is emulsified in an agitated manufacturing vehicle in which there is also dissolved an organic polymeric well-forming material. The resulting system is then treated in any manner, well-known by the art to cause deposition of the organic polymeric wall-forming around the core material. For example, diluting with additional vehicle, changing the pH of the system, or adding a salt or a second polymer material, cause the organic polymeric material to come out of solution and deposit around individual liquid particles of core material. The system is subsequently treated to get and solidify the organic polymeric wall-forming material by any of the methods well-known in the art—for example—cooling, pH change, crosslinking with aldehydes such as formaldehyde, glutaraldehyde, alums, and the like. The wall is now solidified or at least partially insolubilized but remains elastic and readily distorted because it is swollen by the manufacturing vehicle physically entrained therein. This eliminates the necessity of removing the capsules from the liquid vehicle and redispersing them in a separate vehicle. The resinous binder is then dissolved or dispersed in the same or an additional portion of the manufacturing vehicle and the two are mixed to form a homogeneous dispersion.

The amount of plasticizing or swelling of the capsule walls can vary to a greater or lesser extent depending upon conditions familiar to those skilled in the art, e.g., the kind of materials involved, their proportions, and the like. However, for purposes of this invention the plasticizer or swelling action of the capsule walls cannot be so great as to render the walls permeable to permit release of the liquid internal core material.

The differences between plasticizing and swelling have not been clearly delineated in the art. However, it is to be understood that the elasticity and ready distortion of the wall is its important characteristic during the coating step of this process. Such characteristic can be determined by a visual analysis of the capsules themselves under an applied pressure. A microcope can be employed to ascertain the elasticity and ready distortion of the walls of capsules of microscopic dimensions.

The liquid vehicle, when defined as inert, is meant to be chemically inactive with respect to the other components of the system. However, as aforementioned, the word "inert" is meant to include a physical action on the walls of the capsule. For example, in many cases such liquid vehicle will either plasticize or swell the capsule walls. This plasticizing or swelling action produces the elastic, readily distorted state of the capsule wall. The inert liquid vehicle can be either aqueous such as water or nonaqueous, for example, naphtha, xylene, toluene, cyclohexane and the like, depending upon the nature of the wall material and the liquid internal core material. Because most of the liquid internal core materials which have walls deposited thereon are water insoluble, aqueous vehicles are prferred.

The capsules are present in the dispersion, en masse, that is, in great profusion and distributed substantially homogeneously throughout. These capsules can vary in size from microcapsules too small to be seen by the naked eye and having a diameter of about 5 microns to microcapsules having a diameter of about 2000 microns. However, the advantages of this process are most dramatically exhibited in coating capsules of about 20 microns or more in diameter.

The walls of the capsules, when described as elastic and readily distorted, are meant to be in a condition in which they will give under applied pressure thus being more difficult to rupture than in their final hardened condition. Particular attention is directed again to FIGS. 2*a*, 2*b* and 2*c*, which illustrate in a highly idealized fashion, the effect of pressure on the wall of an individual capsule. Of course, it must be kept in mind that the actual dispersion contains a great profusion of capsules, each lying next to or over another, and each of which experiences the pressures applied to a greater or lesser extent depending on its position in the dispersion. However, the capsule walls in their elastic and readily distorted condition can withstand the pressures applied during the coating step of this process.

Generally, the walls of the capsules are composed of one or more of any of the naturally occurring or synthetic organic polymers well-known in the art of making capsules. Such polymers are easily selected depending upon the nature of each of the inert liquid vehicle and the internal core material. Examples of such organic polymers are the naturally occurring polymers such as gelatin, gum arabic, carrageenan, zein, guar gum, and the like, and synthetic polymers such as polyethylene oxide, polyvinyl pyrrolidone, ethyl cellulose, polyvinyl alcohol, polyethylene glycols, polyethylene, polyethylene imine, partially or completely hydrolyzed copolymers of ethylene maleic anhydride and the like.

The internal core material of the capsules is essentially liquid, for example, an odoriferous material such as a fragrance of menthol. The internal core material can also have solid particles dispersed or dissolved in it so long as it remains essentially in a liquid state. Generally, the characteristics of the liquid internal core material which one desires to encapsulate will determine which inert liquid vehicle and organic polymeric wall material is best employed in establishing the dispersion. Such a determination can readily be made by one skilled in the capsule-making are based upon the known hydrophilic-hydrophobic qualities of each material.

The resinous binder material which is dispersed or dissolved in the inert liquid vehicle and adheres the capsules to the substrate upon which they are to be coated is selected from any of those well-known in the coating art. If the inert liquid vehicle is aqueous, representative binders are polyvinyl alcohol, starch, polyacrylic acid, gum arabic, carboxymethyl cellulose or the like. If the vehicle is an organic liquid, then illustrative binders which can be employed are ethyl cellulose, cellulose acetate, polyvinyl acetate, shellac, natural gums, and the like.

Various other ingredients, each of which is well-known for its use in the coating art can be added to the dispersion, usually in small proportions. Illustrative of these are viscosity controlling materials such as clays, colloidal silicas, and sodium carboxymethyl cellulose, pigments, dyes, wetting agents such as sodium lauryl sulfate and the like, and antifoam agents such as dimethyl polysiloxane and octanol.

Representative of the screens employed to coat the substrate in accordance with this invention are the mono- or multi-filament types well-known in the screen-coating art. The monofilament design is preferred because it exhibits lower surface tension and provides more uniform openings. Among the materials employed to form the screen are nylon, rayon, Dacron, metals such as stainless steel, silk and the like. Nylon and Dacron are preferred because of their release characteristics during the coating operation. As aforedescribed, although the open portion of the screen employed to coat the substrate can be the entire area of the screen, generally it has an open portion defining an image which is to be coated on the substrate. In order to form such image, the remaining pores of the screen are blocked with an inert material such as nitrocellulose lacquers, and the like. Any material can be employed to block the pores as long as it is completely inert to each of the ingredients of the coating composition. The mesh size of the screen is generally dependent upon considerations familiar to those skilled in the art, for example, the viscosity of the dispersion, the size of the capsules and the like. Such mesh size can generally vary from about 50 microns to about 5000 microns across a single opening.

The screen is placed over a substrate to be coated with the lower surface of the wires either in contact with the surface of the substrate or slightly above. If the screen is located slightly above the substrate then it must be sufficiently flexible such that the pressure applied during the coating operation forces the screen downward to contact the substrate.

The substantially homogeneous capsular dispersion is introduced onto the screen either prior to or after the screen is placed over the substrate. The viscosity of the dispersion is controlled such that the dispersion will not flow through the open portions of the screen without the application of pressure thereto, for example, by the squeegee normally employed in screen coating. The dispersion is spread uniformly across the entire screen to a thickness which will give the desired amount of transfer through its open portions to the substrate below.

After the screen is in place over the substrate, sufficient pressure is applied to the viscous disperion to force it through the screen and into contact with the substrate beneath. Of course, the dispersion will only flow through the open portion of the screen to print an image on the substrate coinciding with the configuration of this open portion. Because of the elastic, readily distorted condition of the walls of the capsules employed in this process, the walls tend to give under the applied sliding, shearing pressure rather than rupture.

The screen is separated from the substrate after coating the viscous capsular dispersion onto the substrate. The inert liquid vehicle is then removed, for example, by drying, leaving the capsules firmly adhered to the substrate by the binder. The drying operation can be carried out at ambient temperature or it can be shortened by increasing the temperature and/or decreasing the humidity of the environment. Before, during or after the drying period, the capsules can be hardened, for example, by ultraviolet radiation, or other known treatments. Preferably, the drying operation also effects the complete hardening of the capsule walls. As previously described, the organic polymeric walls of the capsules are elastic and readily distorted because of the presence therein of either the inert liquid vehicle which swells the walls or a plasticizer. When either is present, it is sufficiently volatile to be removed during the drying operation. Once the hardening of the capsule walls is completed, they are ruptured by applying pressures to them which are equal to or less than that pressure applied during the coating of the capsular dispersion through the screen onto the substrate.

The substrate upon which the capsular dispersion is coated in accordance with this invention can be any material which is not adversely affected by any ingredient in the dispersion. Representative of such substrate materials are the various kinds of papers including, for example, kraft, Bristol board, uncoated offset papers, bond, clay and titanium dioxide coated papers, and the like, plastics such as polyethylene, Mylar, cellulose acetate, polystyrene and the like, and fabrics such as cotton and rayon materials and the like. The substrate can also be rigid such as wood, metal and glass.

If the substrate is adversely affected by one or more ingredients of the viscous capsular dispersion prior to coating such a dispersion on the substrate, a barrier layer may be coated over the entire substrate or in a configuration coinciding essentially with the image of the viscous dispersion coated through the open portion of the screen. The same screen can be employed to apply both the barrier layer and the viscous dispersion to the substrate. The use of a barrier layer is well known in the coating art, It wets the substrate and is wetted by the viscous capsular dispersion in order that the resinous binder can adhere the capsules to such barrier layer. Conventional additives, similar to those aforedescribed as contained in the viscous capsular dispersion can be included in the barrier coating and need not be repeated.

Example I

Single oil drop capsules having an average diameter of about 20 microns were prepared by emulsifying together at 35 to 40 degrees centigrade with agitation in a Waring Blendor 90 grams of an 11% aqueous gelatin solution at a pH of about 4.75, 100 grams of water and 120 ml. of pine oil fragrance. This emulsion was added to 90 grams of an 11% aqueous gum arabic solution at a pH of about 4.75 and 100 grams of water. 200 grams of water were added as a final dilution. The resulting system was cooled slowly to about 26 degrees centigrade and then chilled in an ice bath to about 10 degrees centigrade. 5 ml. of glutaraldehyde were added to assist in the initial solidification of the resulting capsule walls. The encapsulated pine oil fragrance obtained amounted to about 20%, by weight, of the total resultant dispersion. The capsules were not removed from their aqueous vehicle.

A barrier coating in the image of a pine tree and containing an oleoresinous base, nitrocellulose, naphtha solvent and an emerald green pigment was laid down on paper. It was coated using a silk screen having openings of 125 microns. Its open portion defined the configuration of a pine tree. The barrier coat was thoroughly dried.

A substantially homogeneous viscous capsular dispersion was prepared by thoroughly mixing 50 parts of the previously prepared aqueous dispersion of capsules containing pine tree fragrance as the liquid internal core material, 50 parts of a 10% aqueous solution of polyvinyl alcohol and .05 part of an antifoam agent, octanol. The resulting dispersion was introduced evenly onto the same silk screen previously placed over the paper. By means of a squeegee sufficient pressure was applied to the capsular dispersion to cause it to flow through the pores of the screen and transfer to the paper in a pine tree image exactly coinciding with the barrier layer previously coated on the paper. There was essentially no rupture of the capsules within the dispersion. The screen was then separated from the paper.

The inert aqueous vehicle was removed from the capsular coating by drying. The drying operation also removed the aqueous vehicle which was entrained within the walls of the capsules leaving hard, easily rupturable capsules adhered to the barrier layer by the polyvinyl alcohol binder. Such capsules would release a fragrance of pine oil when ruptured by a hard object.

Example II

Hard, easily rupturable capsules having an internal core material of peppermint oil were coated onto a scarlet red barrier layer previously coated onto paper in the image of a candy cane. The procedures, ingredients, proportions thereof and conditions of Example I were followed, with the exceptions that peppermint oil was substituted for the pine oil and the scarlet red pigment was substituted for the emerald green. Again, such capsules would release a fragrance of peppermint oil when ruptured with a hard object.

Example III

Aggregate drop capsules having a total average diameter of about 20 microns were prepared by emulsifying together at 50 degrees centigrade in a Waring Blendor 82 grams of an 11% aqueous gelatin solution, 90 grams of water and 67.5 ml. of menthol fragrance. The pH of the emulsion was 7.5. This emulsion was added to 82 grams of an 11% aqueous gum arabic solution, 5.8 grams of a 5% aqueous solution of a copolymer of vinylmethylether and maleic anhydride and an additional 90 grams of water. With the temperature still at 50 degrees centigrade and the PH remaining at 7.5, an additional 639 grams of water was slowly added to the resultant system. The pH was lowered to 4.6 by dropwise addition of a 14% aqueous solution of acetic acid, while maintaining the temperature at 50 degrees centigrade. The resultant system was chilled quickly to 10 degree centigrade in an ice bath. 4.5 milliliters of a 25 percent aqueous solution of glutaraldehyde were added to assist in the initial insolubilization and solidification of the capsule walls. About 30 minutes later, 13 milliliters of a 5 percent aqueous solution of the same polymer of vinylmethylether and maleic anhydride was added to complete the initial solidification of the capsule walls. The methanol containing capsules amounted to about 9 percent, by weight, of the total resulting dispersion. The capsules were not removed from their aqueous vehicle.

A barrier coating containing ethyl cellulose and a blend of white and blue pigments having an image of a shaving cream can was laid down on paper in accordance with the procedure of Example I, except that a Dacron screen was substituted for the silk screen.

A portion of the inert aqueous vehicle in which the menthol capsules were dispersed was removed to adjust the weight of the capsules in the inert vehicle to 20 percent of the total. A substantially homogeneous viscous capsular dispersion was prepared by thoroughly mixing 50 parts of the previously aqueous menthol capsule dispersion, 50 parts of a 10 percent aqueous solution of polyvinyl alcohol and .05 part of an antifoam agent, octanol. The viscous dispersion was introduced uniformly onto the same screen previously placed over the paper substrate. By means of a squeegee, sufficient pressure was applied to the capsular dispersion to cause it to flow through the pores of the screen and transfer to the underlying paper in an image coinciding with the previously coated barrier layer. There was essentially no rupture of the capsules within the dispersion.

The inert vehicle, including that portion which was entrained within the walls of the capsules, was removed from the capsular coating by drying. There was obtained a layer of hard, easily rupturable capsules adhered to the barrier layer by the polyvinyl alcohol binder. Such capsules released a menthol fragrance when ruptured.

Example IV

Hard, rupturable capsules having a liquid internal core material of lemon oil were coated onto a yellow barrier layer previously coated onto paper in the image of a lemon. The procedures, ingredients, proportions thereof and conditions of Example III were followed, with the exceptions of substituting lemon oil for the menthol and yellow pigment for the blend of white and blue pigments. The resulting capsules released a fragrance of lemon oil when ruptured.

While there have been shown and described in detail, certain preferred embodiments of the present invention, it will be apparent to those skilled in the art that such embodiments are illustrative only and that various modifications can be made without departing from the spirit of the invention defined by the scope of the following claims.

What is claimed is:

1. A method of coating a substrate with capsules, en masse, the capsules having an externally dry hardened pressure-rupturable wall containing a liquid internal core comprising the steps of:

(a) establishing a substantially homogeneous, en masse, capsular dispersion comprising:
  (i) an inert liquid vehicle
  (ii) capsules comprising elastic, easily distorted organic polymeric walls and liquid internal cores dispersed in the vehicle,
  (iii) a resinous binder dissolved or dispersed in the vehicle for adhering the capsules to the substrate, (b) placing a screen over the substrate, the screen having open portions defining a configuration to be coated on the substrate, (c) introducing the dispersion of (a) onto the screen, the viscosity of the dispersion and the mesh size of the screen being such that the dispersion will not flow through the screen without the application of pressure thereto, steps (b) and (c) being performed in either order, (d) applying pressure to the dispersion sufficient to cause it to transfer to the substrate through the screen and form a coating on the substrate in a configuration defined by the open portions of the screen, the applied pressure distorting the capsule walls but being insufficient to rupture the capsule walls, (e) separating the screen and the substrate, (f) drying the coating whereby the liquid vehicle is removed and the resinous binder adheres the capsules to the substrate and, (g) hardening the elastic, readily distorted walls of the capsules, the hardened walls of the capsules being rupturable by pressure less than that required to rupture the walls of the capsules in their original elastic, readily distorted state, steps (f) and (g) being performed in either order or simultaneously.

2. The method of claim 1 in which the inert liquid vehicle is aqueous.

3. The method of claim 2, following step (b), comprising the additional step of coating the substrate with a resinous moisture resistant barrier.

4. The method of claim 1 in which during step (a) the inert liquid vehicle swells the capsule walls.

5. The method of claim 4 in which steps (f) and (g) are carried out simultaneously by drying whereby the liquid vehicle removed from the coating includes that which swells the capsule walls.

6. The method of claim 5 in which the inert liquid vehicle is aqueous.

7. The method of claim 1 in which the dispersion of step (a) is established by dispersing liquid core material in the inert liquid vehicle containing the wall material and depositing the wall material around the liquid core particles.

8. The method of claim 7 in which the inert liquid vehicle is aqueous.

9. The method of claim 8 in which during step (a) the inert liquid vehicle swells the capsule walls.

10. The method of claim 1 in which the dispersion of step (a) is established by introducing capsules into the inert liquid vehicle.

11. The method of claim 10 in which the inert liquid vehicle is aqueous.

12. The method of claim 10 in which the inert liquid vehicle is non-aqueous.

13. The method of claim 12 in which during step (a) the inert liquid vehicle swells the capsule walls.

14. The method of claim 1 in which the liquid internal cores comprise an odoriferous material.

References Cited

UNITED STATES PATENTS

| | | | |
|---|---|---|---|
| 2,779,269 | 1/1957 | Hill | 117—38X |
| 2,988,461 | 6/1961 | Eichel | 252—316X |
| 3,202,533 | 8/1965 | Sachsel et al. | 117—36.1X |
| 3,317,433 | 5/1967 | Eichel | 117—36.1X |
| 3,325,438 | 6/1967 | Cahero | 117—38X |
| 3,472,674 | 10/1969 | Kite | 117—36.1 |
| 3,494,872 | 2/1970 | Maierson et al. | 117—36.1X |

ROBERT F. BURNETT, Primary Examiner

R. L. MAY, Assistant Examiner

U.S. Cl. X.R.

117—45; 252—316

UNITED STATES PATENT OFFICE
CERTIFICATE OF CORRECTION

Patent No. 3,578,482 Dated May 11, 1971

Inventor(s) John G. Whitaker and Victor A. Crainich, Jr.

It is certified that error appears in the above-identified patent and that said Letters Patent are hereby corrected as shown below:

Column 1, line 16, "distored" should be --distorted--; line 53, "be" should be --a--. Column 5, line 11, "well-forming" should be --wall-forming--; line 19, "get" should be --gel--; line 47, "microcope" should be --microscope--; line 64, "prferred" should be --preferred--. Column 6, line 37, "are" should be --art--. Column 7, line 24, "disperion" should be --dispersion--. Column 9, line 13, "methanol" should be --menthol--; line 27, after "previously" insert --prepared--.

Signed and sealed this 14th day of September 1971.

(SEAL)
Attest:

EDWARD M.FLETCHER,JR.
Attesting Officer

ROBERT GOTTSCHALK
Acting Commissioner of Patents